(12) United States Patent
Hayner et al.

(10) Patent No.: US 12,119,482 B2
(45) Date of Patent: *Oct. 15, 2024

(54) GRAPHENE-CONTAINING METALIZED SILICON OXIDE COMPOSITE MATERIALS

(71) Applicant: NANOGRAF CORPORATION, Chicago, IL (US)

(72) Inventors: Cary Michael Hayner, Chicago, IL (US); Aaron Yost, Evanston, IL (US); Kathryn Hicks, Chicago, IL (US); Seonbaek Ha, Chicago, IL (US); Pitawat Mahawattanangul, Chicago, IL (US); Joshua J. Lau, Chicago, IL (US)

(73) Assignee: NANOGRAF CORPORATION, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/322,181

(22) Filed: May 17, 2021

(65) Prior Publication Data

US 2021/0359295 A1 Nov. 18, 2021

Related U.S. Application Data

(60) Provisional application No. 63/041,388, filed on Jun. 19, 2020, provisional application No. 63/026,434, filed on May 18, 2020.

(51) Int. Cl.
*H01M 4/133* (2010.01)
*H01M 4/134* (2010.01)
(Continued)

(52) U.S. Cl.
CPC .......... *H01M 4/366* (2013.01); *H01M 4/133* (2013.01); *H01M 4/134* (2013.01); *H01M 4/136* (2013.01);
(Continued)

(58) Field of Classification Search
None
See application file for complete search history.

(56) References Cited

U.S. PATENT DOCUMENTS 6,391,495 B1 * 5/2002 Choi .................... H01M 4/587
427/113
8,551,650 B2 10/2013 Kung et al.
(Continued)

FOREIGN PATENT DOCUMENTS

CN 106992292 * 7/2017 ............ B82Y 30/00
CN 106992292 A 7/2017

OTHER PUBLICATIONS

Habibi et al, Fast Synthesis of Turbostratic Carbon Thin Coating by Cathodic Plasma Electrolysis, 621 Thin Solid Films 253-58 (Year: 2017).*

(Continued)

*Primary Examiner* — Yoshitoshi Takeuchi
(74) *Attorney, Agent, or Firm* — THE MARBURY LAW GROUP PLLC

(57) ABSTRACT

Active material composite particles, an electrode including the composite particles, a lithium ion secondary battery including the electrode, and method of forming the same, in which the composite particles each include a core particle including an alkali metal or an alkali earth metal silicate, and a coating disposed on the surface of the core particle. The coating includes turbostratic carbon having a Raman spectrum having: a D band having a peak intensity ($I_D$) at wave number between 1330 cm$^{-1}$ and 1360 cm$^{-1}$; a G band having a peak intensity ($I_G$) at wave number between 1580 cm$^{-1}$ and 1600 cm$^{-1}$; and a 2D band having a peak intensity ($I_{2D}$) at wave number between 2650 cm$^{-1}$ and 2750 cm$^{-1}$, wherein a ratio of $I_D/I_G$ ranges from greater than zero to about 1.1, and a ratio of $I_{2D}/I_G$ ranges from about 0.4 to about 2.

18 Claims, 7 Drawing Sheets

(51) Int. Cl.
H01M 4/136 (2010.01)
H01M 4/36 (2006.01)
H01M 4/38 (2006.01)
H01M 4/48 (2010.01)
H01M 4/58 (2010.01)
H01M 4/583 (2010.01)
H01M 4/587 (2010.01)
H01M 4/62 (2006.01)
H01M 10/0525 (2010.01)
H01M 4/02 (2006.01)

(52) U.S. Cl.
CPC ........... *H01M 4/382* (2013.01); *H01M 4/386* (2013.01); *H01M 4/483* (2013.01); *H01M 4/5825* (2013.01); *H01M 4/587* (2013.01); *H01M 4/622* (2013.01); *H01M 10/0525* (2013.01); *H01M 2004/027* (2013.01)

(56) References Cited

U.S. PATENT DOCUMENTS

| | | | |
|---|---|---|---|
| 8,778,538 | B2 | 7/2014 | Kung et al. |
| 9,728,773 | B2 | 8/2017 | Kung et al. |
| 10,135,059 | B2 | 11/2018 | Huang et al. |
| 10,135,063 | B2 | 11/2018 | Huang et al. |
| 2004/0137328 | A1* | 7/2004 | Kim ............ H01M 4/133 427/113 |
| 2014/0255785 | A1 | 9/2014 | Do et al. |
| 2017/0170465 | A1* | 6/2017 | Kim ............ H01M 4/366 |
| 2018/0083272 | A1* | 3/2018 | Son ............. H01M 4/133 |
| 2018/0257942 | A1* | 9/2018 | Takeshita ......... H01B 1/04 |
| 2018/0342757 | A1* | 11/2018 | Choi ............ H01M 4/386 |

OTHER PUBLICATIONS

Notification Concerning Transmittal of International Preliminary Report on Patenability and Written Opinion of the International Search Authority for International Patent Application No. PCT/US2021/032692, mailed Dec. 1, 2022, 7 pages.

Notification of Transmittal of the International Search Report and Written Opinion of the International Search Authority for International Patent Application No. PCT/US2021/032692, mailed Sep. 7, 2021, 10 pages.

Dong, X. et al., "Polyacrylonitrile-based turbostratic graphite-like carbon wrapped silicon nanoparticles: a new-type anode material for lithium ion battery", RSC Advances 2016, vol. 6, No. 16, pp. 12737-12743, (2016); https://doi.org/10.1039/C5RA25380B.

Habibi, A. et al., "Fast Synthesis of Turbostratic Carbon Thin Coating by Cathodic Plasma Electrolysis", Thin Solid Films, vol. 621, pp. 253-258, (2017); https://doi.org/10.1016/j.tsf.2016.05.036.

* cited by examiner

GRAPHENE-CONTAINING METALIZED SILICON OXIDE COMPOSITE MATERIALS

TECHNICAL FIELD

Aspects of the present disclosure relate to graphene-containing metalized silicon oxide composite active materials, negative electrodes including the same, and batteries including the negative electrodes.

BACKGROUND

Lithium (Li) ion electrochemical cells typically require materials that enable high energy density, high power density and high cycling stability. Li ion cells are commonly used in a variety of applications, which include consumer electronics, wearable computing devices, military mobile equipment, satellite communication, spacecraft devices and electric vehicles, and are particularly popular for use in large-scale energy applications such as low-emission electric vehicles, renewable power plants, and stationary electric grids. Additionally, lithium-ion cells are at the forefront of new generation wireless and portable communication applications. One or more lithium ion cells may be used to configure a battery that serves as the power source for any of these applications. It is the explosion in the number of higher energy demanding applications, however, that is accelerating research for yet even higher energy density, higher power density, higher-rate charge-discharge capability, and longer cycle life lithium ion cells. Additionally, with the increasing adoption of lithium-ion technology, there is an ever increasing need to extend today's energy and power densities, as applications migrate to higher current needs, longer run-times, wider and higher power ranges and smaller form factors.

Silicon or silicon alloy anode materials are currently included in most long-term lithium-ion technology adoption roadmaps as a practical means to achieve higher energy and power densities. Silicon is a desirable negative electrode active material for lithium ion electrochemical cell applications having a theoretical gravimetric capacity of about 4,200 mAh/g and volumetric capacity of about 9786 mAh/cm$^3$ when fully lithiated. Silicon is also a desirable replacement for current graphite-based anodes as its high lithium storage capacity can exceed 7x that of graphite. Market adoption of silicon-based anodes for use in lithium ion cells, however, has been challenged by rapid cycle life degradation, poor charge-discharge rate capability under high power demands, and subpar or deficient coulombic efficiency, all of which may result from extreme anode volume changes during charge and discharge (volume expansions of up to 400% have been noted). Cycle life degradation in silicon-based alloys is well understood, and can be broken down into two fundamental mechanisms: (1) electrical disconnection, and (2) unstable solid electrolyte interface (SEI) resulting in lithium ion consumption and impedance growth. High rate capability and coulombic efficiency are also compromised by these mechanisms. Electrical disconnection occurs with significant volume fluctuations during charge and discharge due to large volume changes upon lithiation and delithiation.

These large volume changes may cause pulverization (stress-induced cracking and fracture) of the silicon particles and loss of electrical contact between these active silicon particles. The result is an electrochemical cell having low power capability and rapid capacity fade. The cracking and fracture introduced in mechanism (1) further worsens cell performance by subsequently promoting mechanism (2), an unstable SEI. Because cracking and fracture expose new Si surfaces to the electrolyte solvents, further SEI formation occurs, depositing lithiated compounds on the new Si surfaces. During charge/discharge cycling, the insulating SEI layer also grows thicker, further degrading the capacity and cycling stability of the Si anode, and compromising charge/discharge rate capability and coulombic efficiency.

Continuous and new growth of the SEI layer gradually deplete the available Li$^+$ and, due to side reactions with the electrolyte solvent and salt(s), the amount of serviceable electrolyte is depleted as well, thereby deteriorating overall electrochemical cell performance. The use of silicon-based anodes in applications requiring high electrochemical cell charge/discharge rates, therefore, is severely limited resultant from the high ohmic and ionic contributions to polarization resulting from these mechanisms.

Accordingly, there is a need for silicon-based electrode materials that have improved first cycle efficiency and cycle life.

Accordingly, there is a need for an advanced anode active material for use in an electrochemical cell that incorporates carbon materials of defined quality characteristics that favorably impact electrochemical cell cyclability. More specifically, there is a need for advanced silicon-based composite anode materials that comprise low-defect turbostratic carbon that enables lithium ion electrochemical cell cycle life stability, energy density, and rate performance.

SUMMARY

According to various embodiments of the present disclosure, active material composite particles comprise a core particle including an alkali metal or an alkali earth metal silicate, and a coating disposed on the surface of the core particle. The coating includes turbostratic carbon having a Raman spectrum having: a D band having a peak intensity ($I_D$) at wave number between 1330 cm$^{-1}$ and 1360 cm$^{-1}$; a G band having a peak intensity ($I_G$) at wave number between 1580 cm$^{-1}$ and 1600 cm$^{-1}$; and a 2D band having a peak intensity ($I_{2D}$) at wave number between 2650 cm$^{-1}$ and 2750 cm$^{-1}$, wherein a ratio of $I_D/I_G$ ranges from greater than zero to about 1.1, and a ratio of $I_{2D}/I_G$ ranges from about 0.4 to about 2.

According to various embodiments of the present disclosure, a method of forming active material composite particles comprises: forming a mixture comprising core particle comprising an alkali metal or an alkali earth metal silicate and turbostratic carbon; and spray drying the mixture to form composite particles comprising the core particles coated with the turbostratic carbon. The turbostratic carbon has a Raman spectrum having: a D band having a peak intensity (ID) at wave number between 1330 cm−1 and 1360 cm−1; a G band having a peak intensity (IG) at wave number between 1580 cm−1 and 1600 cm−1; and a 2D band having a peak intensity (I2D) at wave number between 2650 cm−1 and 2750 cm−1. A ratio of ID/$I_G$ that ranges from greater than zero to about 1.1, and a ratio of $I_{2D}/I_G$ that ranges from about 0.4 to about 2.

Other principal features and advantages of the invention will become apparent to those skilled in the art upon review of the following drawings, the detailed description, and the appended claims.

DETAILED DESCRIPTION OF THE PREFERRED EMBODIMENTS

Figure 1A:
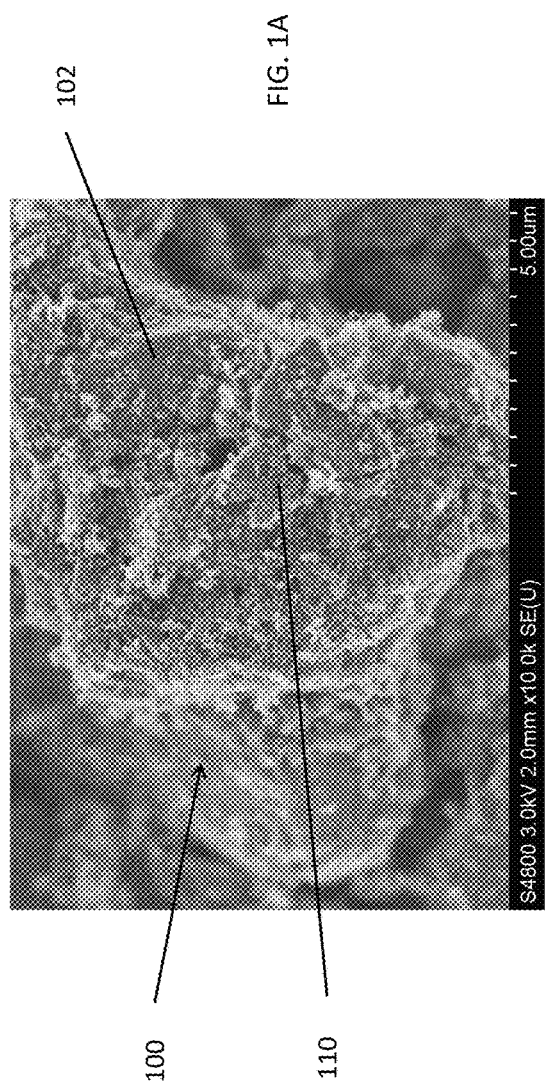
FIG. 1A is a scanning electron microscope (SEM) image of an active material composite particle, according to various embodiments of the present disclosure.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention. It will also be understood that the term "about" may refer to a minor measurement errors of, for example, +/−5% to 10%.

Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

An "electrode material" is defined as a material that may be configured for use as an electrode within an electrochemical cell, such as a lithium ion rechargeable battery. An "electrode" is defined as either an anode or a cathode of an electrochemical cell. A "composite electrode material" is also defined to include active material particles combined with one of particles, flakes, spheres, platelets, sheets, tubes, fibers, or combinations thereof and that are of an electrically conductive material. The particles, flakes, spheres, platelets, sheets, tubes, fibers or combinations thereof may further be one of flat, crumpled, wrinkled, layered, woven, braided, or combinations thereof.

The electrically conductive material, may be selected from the group consisting of an electrically conductive carbon-based material, an electrically conductive polymer, graphite, a metallic powder, nickel, aluminum, titanium, stainless steel, and any combination thereof. The electrically conductive carbon-based material may further include one of graphite, graphene, diamond, pyrolytic graphite, carbon black, low defect turbostratic carbon, fullerenes, or combinations thereof. An "electrode material mixture" is defined as a combination of materials such as: material particles (either electrochemically active, electrically conductive, composite or combinations thereof), a binder or binders, a non-crosslinking and/or a crosslinking polymer or polymers, which are mixed together for use in forming an electrode for an electrochemical cell. An "electrochemically active material", "electrode active material" or "active material" is defined herein as a material that inserts and releases ions such as ions in an electrolyte, to store and release an electrical potential. The term "inserts and releases" may be further understood as ions that intercalate and deintercalate, or lithiate and delithiate. The process of inserting and releasing of ions is also understood, therefore, to be intercalation and deintercalation, or lithiation and delithiation. An "active material" or an "electrochemically active material" or an "active material particle", therefore, is defined as a material or particle capable of repeating ion intercalation and deintercalation or lithium lithiation and delithiation.

A "defect" is defined as any feature that disrupts the symmetry of the hexagonal lattice of carbon atoms in a given sheet of carbon. In accordance with this definition, a defect may include vacancies, substitutional atoms, edges, grain boundaries or changes to the carbon-hybridization. "Hybridization" is the mixing of standard atomic orbitals to form new orbitals, which can be used to describe bonding in molecules. Mixing of standard atomic orbitals commonly occurs with $sp^2$ and $sp^3$ orbitals.

Defect density is defined as the quantity of symmetry breaking features (defects) in a given unit area of a carbon plane. This value is often estimated as the mean distance between two defects. Defect density can be approximated with Raman spectroscopy using the ratio of $I_D/I_G$.

A "composite particle" may comprise one or more core particles comprising an electrochemically active material and a coating disposed on the surface of the core particle. The coating may comprise carbon materials, such as turbostratic carbon, carbon nanotubes, activated carbon, or any combination thereof.

According to various embodiments of the present disclosure, the core particles are at least partially encapsulated (e.g., covered) by the coating. For example, the coating and/or the turbostratic carbon may cover, on average, from about 10% to about 100%, such as from about 20% to about 90%, from about 25% to about 80%, from about 30% to about 70%, or from about 40% to about 60% of the surface of each core particle. In some embodiments the coating may be in the form of an envelope or shell that at least partially or fully encapsulates one or more of the core particles.

In some embodiments, the coating may have a crumpled morphology. The term "crumpled" is defined as a body or mass displaying a distribution of creases, ripples, folds, wrinkles, and ridges. The term "crumpled" is also defined as to make or become curved. The term "morphology" is defined as a structure and feature or features of a surface. Specifically, "morphology" is the structure and features of the exterior surface of a particle or a macroparticle of an electrode material.

As defined herein a secondary electrochemical cell is an electrochemical cell or battery that is rechargeable. "Capacity" is defined herein as a measure of charge stored by a battery as determined by the mass of active material contained within the battery, representing the maximum amount of energy, in ampere-hours (Ah), which can be extracted from a battery at a rated voltage. Capacity may also be defined by the equation: capacity =energy/voltage or current (A)×time (h). "Energy" is mathematically defined by the equation: energy=capacity (Ah)×voltage (V). "Specific capacity" is defined herein as the amount of electric charge that can be delivered for a specified amount of time per unit of mass or unit of volume of active electrode material. Specific capacity may be measured in gravimetric units, for example, (Ah)/g or volumetric units, for example, (Ah)/cc. Specific capacity is defined by the mathematical equation: specific capacity (Ah/kg)=capacity (Ah)/mass (kg). "Rate capability" is the ability of an electrochemical cell to receive or deliver an amount of energy within a specified time period. Alternately, "rate capability" is the maximum continuous or pulsed energy a battery can provide per unit of time.

"C-rate" is defined herein as a measure of the rate at which a battery is discharged relative to its maximum nominal capacity. For example, a 1C current rate means that the discharge current will discharge the entire battery in 1 hour; a C/2 current rate will completely discharge the cell in 2 hours and a 2C rate in 0.5 hours. "Power" is defined as the time rate of energy transfer, measured in Watts (W). Power is the product of the voltage (V) across a battery or cell and the current (A) through the battery or cell. "C-Rate" is mathematically defined as C-Rate (inverse hours)=current (A)/capacity (Ah) or C-Rate (inverse hours)=1/discharge time (h). Power is defined by the mathematical equations: power (W)=energy (Wh)/time (h) or power (W)=current (A)×voltage (V). Coulombic efficiency is the efficiency at which charge is transferred within an electrochemical cell. Coulombic efficiency is the ratio of the output of charge by a battery to the input of charge.

Active Material Composite Particles

Silicon and silicon alloys may significantly increase cell capacity when incorporated within an electrode of an electrochemical cell. Silicon and silicon alloys are often incorporated within an electrode comprising graphite, graphene, or other carbon-based active materials. Examples of electrodes comprising carbon-based materials and silicon are provided in U.S. Pat. Nos. 8,551,650, 8,778,538, and 9,728,773 to Kung et al., and U.S. Pat. Nos. 10,135,059 and 10,135,063 to Huang et al., all the contents of which are fully incorporated herein by reference.

Herein, "SiO materials" may generally refer to silicon and oxygen-containing materials. SiO materials are of interest for use in anode electrodes of lithium-ion batteries, due to having high theoretical energy and power densities. However, the utilization of current commercial SiO materials, such as silicon oxide (e.g., $SiO_x$, wherein x ranges from 0.8 to 1.2, such as from 0.9 to 1.1) has been limited due to having a low $1^{st}$ cycle efficiency and a high irreversibility. This low $1^{st}$ cycle efficiency is due to high irreversible $Li^+$ reaction with the silicon oxide matrix.

In order to decrease the irreversible $Li^+$ reaction with silicon oxide, various embodiments include metalized SiO materials (M-SiO). Herein, M-SiO materials may refer to active materials that are directly reacted with metal-containing precursors, such as alkali and/or alkali earth containing precursors, such as for example, lithium-containing precursors and/or magnesium-containing precursors, to form metalized silicon and oxygen-containing phases, prior to being utilized in a battery as an active material and/or undergoing charge and discharge reactions. In one embodiment, all or some of the metalizing metal may remain in the active material and does not intercalate (i.e., does not insert) or de-intercalate during battery charging and discharging. Accordingly, M-SiO materials may refer to lithium-metalized SiO (LM-SiO) materials and/or Mg-metalized SiO (MM-SiO) materials. However, in some embodiments, M-SiO materials may include SiO materials that are metalized to include other suitable alkali and/or alkali earth metals, such as sodium, potassium, calcium, or the like. For example, in some embodiments, M-SiO materials may be metalized to include magnesium, lithium, sodium, potassium, calcium, or any combinations thereof.

Electrode materials including M-SiO active materials have been found to provide increased $1^{st}$ cycle efficiency (FCE), as compared to non-metalized SiO materials. Unfortunately, M-SiO materials have been found to suffer from severe electrical disconnection and rapid capacity loss, often leading to more than 90% capacity fade within 20 cycles. Coating M-SiO materials with carbon and/or other materials, and/or blending M-SiO materials with graphite have been found to slightly reduce the electrical disconnection and capacity loss of active materials, delaying the over 50% capacity fade to ~50 cycles, which is still highly unsatisfactory cycling stability for commercial applications. Overall, current M-SiO materials do not exhibit electrical stability sufficient for commercialization.

Figure 1B:
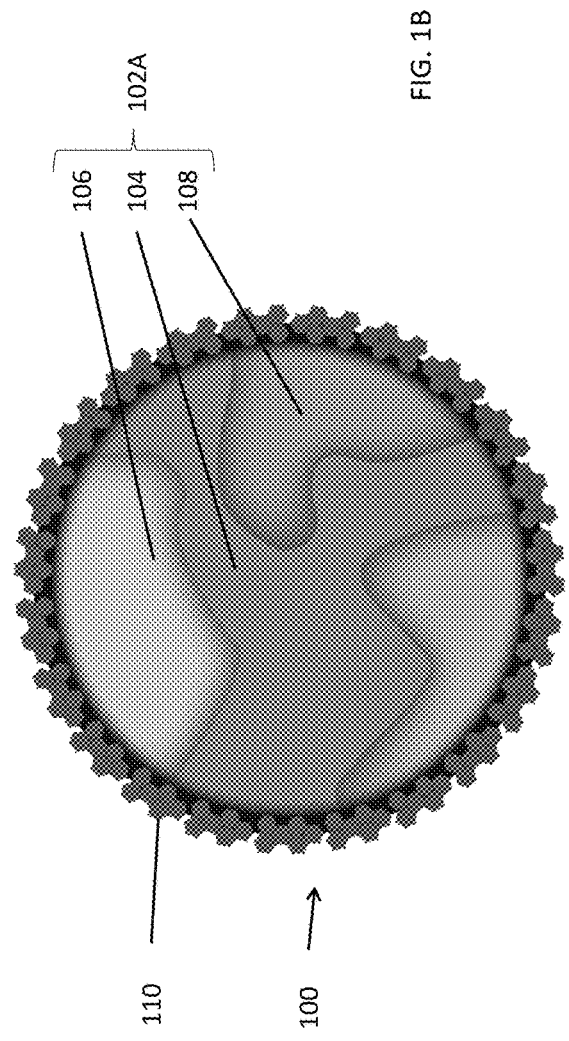
FIGS. 1B-1D are a sectional diagrams of core particles that may be included in a composite particle of FIG. 1A.
Figure 1C:
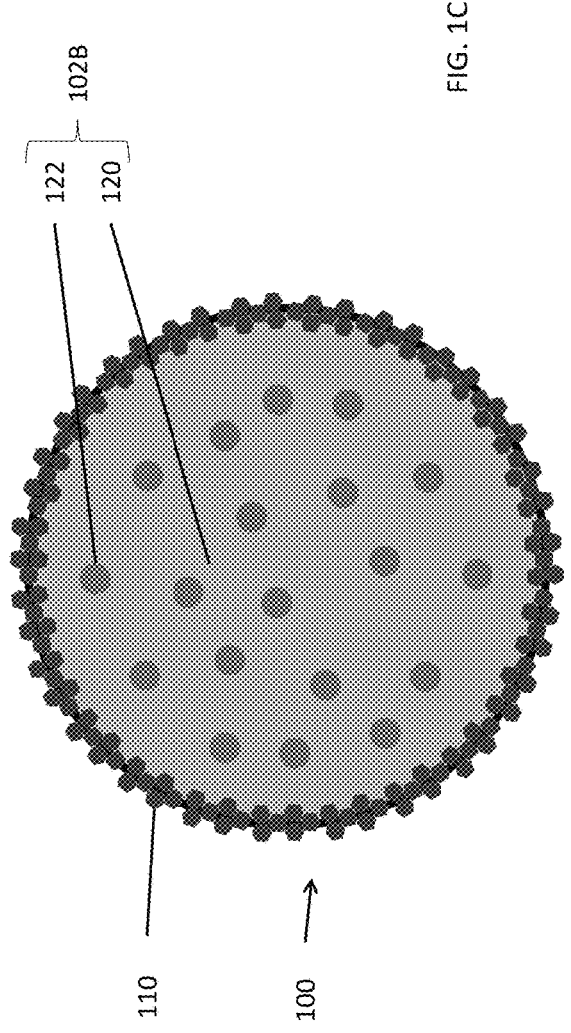
Figure 1D:
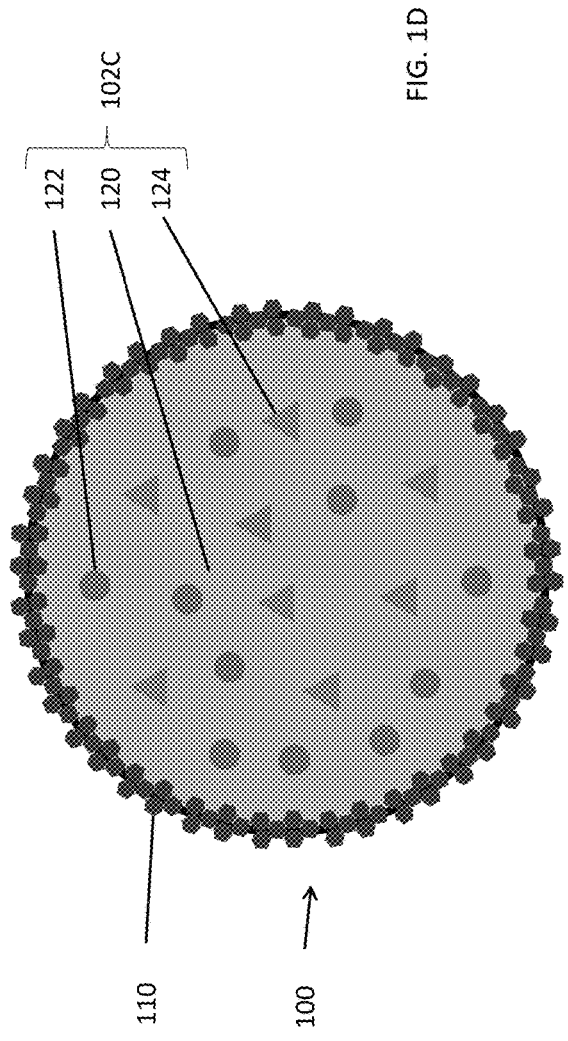

FIG. 1A is a scanning electron microscope (SEM) image of an active material composite particle 100, according to various embodiments of the present disclosure, FIGS. 1B-1D are a sectional diagrams of core particles 102A-102C that may be included in a composite particle 100 of FIG. 1A. Referring to FIGS. 1A and 1B, the composite particles 100 include a core particle 102 comprising an electrochemically active material, and a graphene-containing coating 110 that is coated on and/or encapsulates, the core particle 102.

In preferred embodiments, the active material of the core particle 102 comprises an M-SiO material. As such, the composite particles 100 are described below with respect to core particles 102 that comprise an M-SiO material.

The composite particles 100 and/or core particles 102 may have an average particle size that ranges from about 1 μm to about 20 μm, such as from about 2 μm to about 15 μm, from about 3 μm to about 10 μm, from about 3 μm to about 7 μm, or about 5 μm. The core particles 102 may include M-SiO materials that include metalized silicon species and silicon (e.g., crystalline and/or amorphous silicon). The metalized silicon species may include metalized silicides and metalized silicates. In some embodiments, the M-SiO materials may also include silicon oxide ($SiO_x$, wherein x ranges from 0.8 to 1.2, such as from 0.9 to 1.1). In various embodiments, the M-SiO materials may include lithiated silicon species. Herein, "lithiated silicon species" may include lithium silicides ($Li_xSi$, 0<x<4.4), and/or one or more lithium silicates ($Li_2Si_2O_5$, $Li_2SiO_3$, and/or $Li_4SiO_4$, etc.).

Referring to FIG. 1B, in some embodiments, the composite particles 100 may include heterogeneous core particles 102A that include an M-SiO material that includes multiple silicon-containing material phases 104, 106, 108. For example, the phases 104, 106, 108 may independently comprise crystalline silicon, silicon oxide (e.g., $SiO_x$, wherein x ranges from 0.8 to 1.2, such as from 0.9 to 1.1), and/or lithiated silicon species. However, in some embodiments the core particles 102 may be substantially homogeneous particles that lack distinct phases, but include silicon, oxygen and lithium.

Referring to FIG. 1C, in some embodiments, the composite particles 100 may comprise core particles 102B that include a primary phase 120, in which crystalline silicon domains 122 are dispersed as a secondary phase. For example, the primary phase 120 may include lithiated silicon species such as lithium silicate species, and in particular, $Li_2Si_2O_5$. In other embodiments, the primary phase 120 may comprise magnesium-metalized silicon species, magnesium silicate species, and in particular $MgSiO_3$, $Mg_2SiO_4$, or combination thereof. The crystalline silicon domains 122 may comprise crystalline silicon nanoparticles having a particle size of less than 100 nm. For example, the crystalline silicon domains 122 may have an average particle size ranging from about 3 nm to about 60 nm. In one embodiment, a majority of the crystalline silicon domains 122 may have an average particle size ranging from about 5 nm to about 10 nm, and a remainder of the crystalline silicon domains 122 may have an average particle size from about 10 nm to about 50 nm.

Referring to FIG. 1D, in some embodiments the composite particles 100 may comprise core particles 102C that include a primary phase 120 comprising an M-SiO material, and crystalline silicon domains 122 and $SiO_x$ domains 124 (e.g., $SiO_x$, wherein x ranges from 0.8 to 1.2, such as from 0.9 to 1.1) dispersed in the primary phase 120 as secondary phases. For example, the primary phase 120 may include lithiated silicon species such as lithium silicate species, and in particular, $Li_2Si_2O_5$, the crystalline silicon domains 122 may comprise crystalline silicon nanoparticles, and the $SiO_x$ domains 124 may include $SiO_x$ phases and/or nanoparticles. The crystalline silicon domains 122 and the $SiO_x$ domains 124 may have a particle size of less than about 100 nm. For example, the crystalline silicon domains 122 and the $SiO_x$ domains 124 may have an average particle size ranging from about 3 nm to about 60 nm, such as from about 5 nm to about 50 nm.

In various embodiments, the core particles 102 may represent from about 80 wt % to about 99.5 wt %, such as from about 90 wt % to about 99 wt %, including about 90 wt % to 95 wt % of the total weight of the composite particles 100. In some embodiments the M-SiO material may include from about 40 at % to about 5 at %, such as from 20 at % to about 10 at %, or about 15 at % of lithiated silicon species. In some embodiments the M-SiO material of the core particles 102A may include from about 60 at % to about 95 at %, such as from about 80 at % to about 90 at %, or about 85 at % silicon and $SiO_x$. The M-SiO material of the core particles 102 may have a silicon to oxygen atomic weight ratio ranging from about 1.25:1 to about 1:1.25, such as from about 1.1:1 to about 1:1.1, or of about 1:1. In some embodiments, the M-SiO material of the core particles 102 may comprise approximately equal atomic amounts of crystalline silicon and $SiO_x$.

During an initial charging reaction and/or subsequent charging reactions, the composition of the M-SiO material of the core particles 102A may change due to lithiation and/or other reactions. For example, Si and $SiO_x$ may be lithiated to form $Li_xSi$ domains. In addition, some $SiO_x$ may form inactive species, such as lithium silicates and $Li_2O$.

In various embodiments, the coating 110 may be in the form of a shell that completely encapsulates the core particles 102, as shown in FIGS. 1B-1D. However, in some embodiments, the coating 110 may only partially encapsulate some or all of the core particles 102. In some embodiments, the coating 110 may represent, based on the total weight of a composite particle, from about 0.5 wt % to about 20 wt %, such as from about 1 wt % to about 10 wt %, or from about 5 wt % to about 10 wt %, of the total weight of the composite particle 100.

In some embodiments, the coating 110 may include a flexible, highly-conductive graphene material, such as graphene, graphene oxide, partially reduced graphene oxide, or combinations thereof. For example, the coating 110 may preferably comprise a flexible, highly conductive graphene material having low-defect turbostratic characteristics, which may be referred to as turbostratic carbon. The low-defect turbostratic carbon may be in the form of platelets comprising from one to about 10 layers of a graphene material, such as graphene, graphene oxide, or reduced graphene oxide. In some embodiments, the low-defect turbostratic carbon may comprise at least 90 wt %, such as from about 90 wt % to about 100 wt % graphene. The graphene material may further comprise a powder, particles, monolayer sheets, multi-layer sheets, flakes, platelets, ribbons, quantum dots, tubes, fullerenes (hollow graphenic spheres) or combinations thereof.

The turbostratic carbon may be in the form of sheets or platelets that partially overlap to simulate larger size single sheet structures. In some embodiments the platelets have more than one or more layers of a graphene-based material. In some embodiments, the platelets may have sheet size may be on average ≤15 μm. In some embodiments, the platelets may have sheet size may be on average ≤1 μm. In some embodiments, the turbostratic carbon-based material platelets may have low thickness. In some embodiments, a low thickness of the turbostratic carbon-based material platelets may be on average ≤1 μm. In some embodiments, a low thickness of the turbostratic carbon-based material platelets may be on average ≤100 nm.

In addition to the graphene material, the coating 110 may comprise one or more additives, such as polymers, carbon nanotubes, activated carbon and/or surfactants. In various embodiments, the coating 110 may also comprise lithium-containing species (e.g., LiF or the like), alkali metal species, polymeric coating species, amorphous carbon, and/or other conductive additives or agents. For example, conductive additives or agents may comprise carbon black, KETJENBLACK, Super-P carbon black, low defect turbostratic carbon, acetylene black, channel black, furnace black, lamp black, thermal black, graphite, natural graphite, synthetic graphite, graphite oxide, partially reduced graphite, flake graphite, exfoliated graphite, platelet graphite or combinations thereof. The conductive agent may also comprise one of conductive fibers, carbon fibers, metal fibers, carbon nanotubes (CNTs), single walled CNTs, double walled CNTs, multi-walled CNTs, metal powder, fluorocarbon powder, aluminum powder, nickel powder; nickel flakes, conductive whiskers, zinc oxide whiskers, potassium titanate whiskers, conductive metal oxides, titanium oxide, conductive organic compounds, conductive polyphenylene derivatives, conductive polymers, or combinations thereof.

For example, in some embodiments, the composite particles 100 may include from about 0.5 wt % to about 19 wt %, such as from about 1 wt % to about 10 wt %, or from about 5 wt % to about 10 wt % turbostratic carbon, and from 0 wt % to about 2 wt %, such as from about 0.25 wt % to about 1 wt %, or about 1 wt % carbon nanotubes, based on the total weight of the composite particles 100.

The coating 110 may ensure that the M-SiO material of the core 102 is homogenously/uniformly cycled (movement of electrons and Li-ions in and out of the structure) in all three dimensions, due to its conductive nature, thereby minimizing the stresses exerted on and by the core particle and minimizing particle fracture. Additionally, in the event that the core M-SiO material does fracture, the flexible coating 110 may operate to electrically connect the fractured M-SiO material and maintain the overall integrity of the composite particle 100, thereby leading to significantly improved electrochemical performance.

For example, as discussed in detail below, the graphene-containing coatings 110 have been found to electrically stabilize M-SiO materials and increase cyclability to >300 cycles. In addition, the coatings 110 have been found to provide significantly improved electrical conductivity of the M-SiO materials and higher $1^{st}$ cycle efficiency values, as compared to the raw (e.g., uncoated) M-SiO materials or M-SiO materials coated with graphite and carbon black. In some embodiments, an electrode material including the composite particles 100 may maintain more than 90% of its usable capacity after twenty cycles, which may provide more than a 9-fold increase in usable cycle life.

Turbostratic Carbon

Figure 2C:
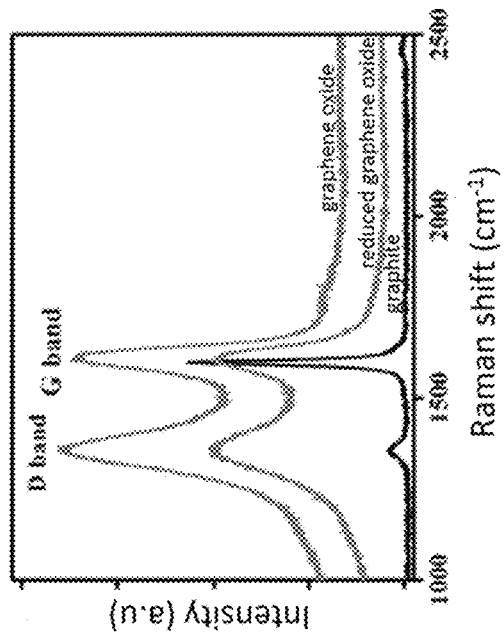
FIGS. 2A, 2B, and 2C illustrate Raman spectra for graphite and various graphene-based materials.
Figure 2B:
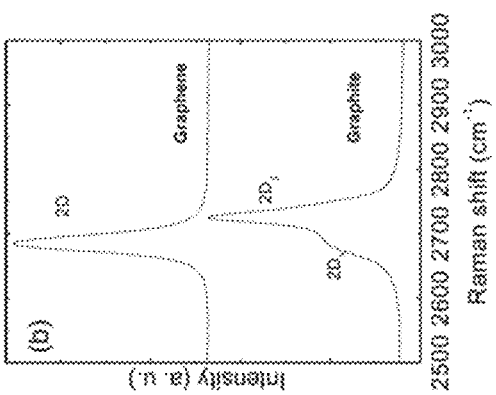
Figure 2A:
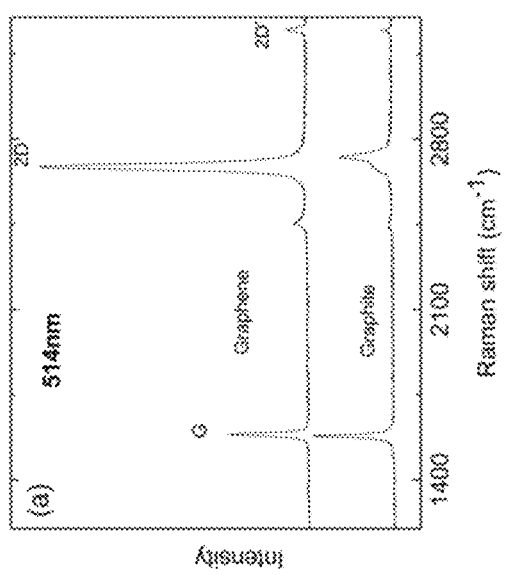

FIGS. 2A, 2B and 2C illustrate Raman spectra for graphite and various graphene-based materials. It has been well established that graphite and graphene materials have characteristic peaks at approximately 1340 $cm^{-1}$, 1584 $cm^{-1}$ and 2700 $cm^{-1}$. The peak at 1340 $cm^{-1}$ is shown in FIG. 2C, and is characterized as the D band. The peak at 1584 $cm^{-1}$ is shown in the spectra of FIGS. 2A and 2C, and is characterized as the G band, which results from the vibrational mode represented by the C=C bond stretching of all pairs of $sp^2$ hybridized carbon atoms. The D band originates from a hybridized vibrational mode associated with graphene edges and it indicates the presence of defects or broken symmetry in the graphene structure. The peak at 2700 $cm^{-1}$ is shown in FIG. 2B, and is characterized as the 2D band, which results from a double resonance process due to interactions between stacked graphene layers. The emergence of a double peak at the 2D wavenumber breaks the symmetry of the peak, and is indicative of AB stacking order between graphene planes in graphite and graphite derivatives such as nanoplatelets. The $2D_1$ peak shown in FIG. 1B becomes suppressed when the AB stacking order in turbostratic multilayer graphene particles is disrupted. The positions of the G and 2D bands are used to determine the number of layers in a material system. Hence, Raman spectroscopy provides the scientific clarity and definition for electrochemical cell carbon material additives, providing a fingerprint for correct selection as additives for active material electrode compositions. As will be shown, the present definition provides that fingerprint for the low-defect turbostratic carbon of the present application. It is this low-defect turbostratic carbon when used as an additive to an electrochemical cell electrode active material mixture that provides superior electrochemical cell performance.

Figure 3:
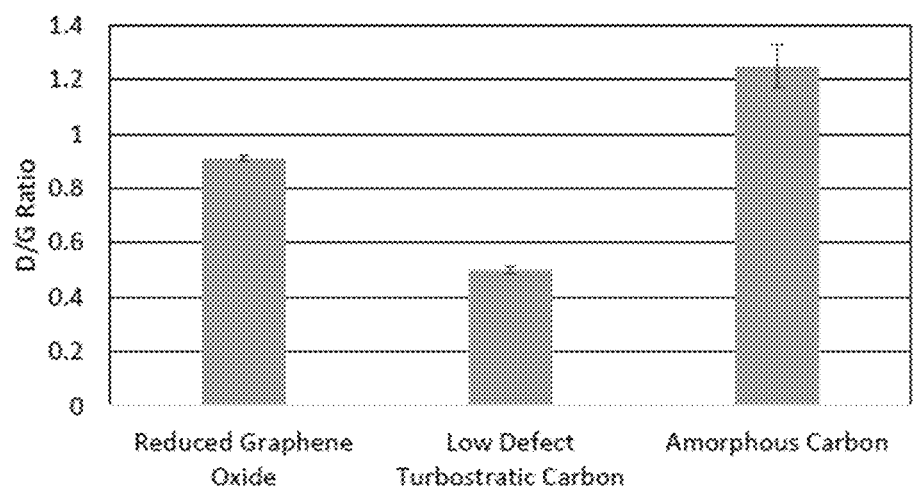
FIG. 3 is a bar chart comparing the 0Raman spectra $I_D/I_G$ ratios of typical carbon materials to low-defect turbostratic carbon.

FIG. 3 provides the $I_D/I_G$ ratio of carbon additives typically used in prior art electrode active material mixtures (i.e., reduced graphene oxide or amorphous carbon) compared with the low-defect turbostratic carbon of the present application.

Reduced graphene oxide (rGO) is a carbon variant that is often referred to as graphene in the industry, however, is unique in final structure and manufacturing process. Graphene oxide is typically manufactured first using a modified Hummers method wherein a graphite material is oxidized and exfoliated into single layers or platelets comprising a few layers of carbon that may comprise various functional groups, including, but not limited to, hydroxyls, epoxides, carbonyls, and carboxyls. These functional groups are then removed through chemical or thermal treatments that convert the insulating graphene oxide into conductive reduced graphene oxide. The reduced graphene oxide is similar to graphene in that it consists of single layers of carbon atom lattices, but differs in that it has mixed sp2 and sp3 hybridization, residual functional groups and often increased defect density resultant from the manufacturing and reduction processes. Reduced graphene oxide is shown in the first bar of FIG. 3 and has an $I_D/I_G$ ratio of 0.9.

Amorphous carbon is often used as an additive or surface coating for both electrochemical cell anode and cathode material mixtures to enhance electrode conductivity. Typically, amorphous carbons are produced using a chemical vapor deposition (CVD) process wherein a hydrocarbon feedstock gas is flowed into a sealed vessel and carbonized at elevated temperatures onto the surface of a desired powder material. This thermal decomposition process can provide thin amorphous carbon coatings, on the order of a few nanometers thick, which lack any sp2 hybridization as found in crystalline graphene-based materials. Amorphous carbon is shown in the third bar of FIG. 3 and has an $I_D/I_G$ ratio >1.2.

Low-defect turbostratic carbon, also referred to as graphene, comprises unique characteristics resultant from its manufacturing processing. One common method of producing this material is through a plasma based CVD process wherein a hydrocarbon feedstock gas is fed through an inert gas plasma in the presence of a catalyst that can nucleate graphene-like carbon structures. By controlling the production parameters, carbon materials having a few layers and absent any AB stacking order between lattices can be produced. These carbon materials are typically highly ordered sp2 carbon lattices with low-defect density.

The low-defect turbostratic carbon of the present disclosure is shown in the center second bar of FIG. 3. The Raman spectrum of the low-defect turbostratic carbon additive of the present application is derived from the intensity ratio of the D band and the G band ($I_D/I_G$) and the intensity ratio of the 2D band and the G band ($I_{2D}/I_G$). The $I_D$, $I_{2D}$, and $I_G$ are represented by their respective integrated intensities. A low $I_D/I_G$ ratio indicates a low-defect material. The low-defect turbostratic carbon material of the present invention has an $I_D/I_G$ ratio of greater than zero and less than or equal to about 0.8, as determined by Raman spectroscopy with $I_G$ at wavenumber in a range between 1580 and 1600 $cm^{-1}$, $I_D$ at wavenumber in a range between 1330 and 1360 $cm^{-1}$, and being measured using an incident laser wavelength of 532 nm. Additionally, the low-defect turbostratic carbon material of the present disclosure exhibits an $I_{2D}/I_G$ ratio of about 0.4 or more. As reference regarding the $I_{2D}/I_G$ ratio, an $I_{2D}/I_G$ ratio of approximately 2 is typically associated with single layer graphene. $I_{2D}/I_G$ ratios of less than about 0.4 is usually associated with bulk graphite consisting of a multitude of AB stacked graphene layers. Hence, the $I_{2D}/I_G$ ratio of about 0.4 or more, for the low-defect turbostratic carbon material of the present disclosure, indicates a low layer count of ≤10. The low-defect turbostratic carbon material of low layer count further lacks an AB stacking order between graphene layers (i.e., turbostratic). The turbostratic nature or lack of AB stacking of these graphene planes is indicated by the symmetry of the $I_{2D}$ peak. It is the symmetry of the 2D peak that distinguishes a turbostratic graphene layered material from an AB stacked graphene layered material, and is indicative of rotational stacking disorder versus a layered stacking order.

Carbon materials with high AB stacking order will still exhibit 2D peaks, however, these 2D peaks exhibit a doublet that breaks the symmetry of the peak. This break in symmetry is exhibited in both AB stacked graphene of a few layers or graphite of many layers. Thus, the 2D peak, which is a very strong indicator of the presence of stacking order regardless of the number of graphene layers present in the material, is of significance when selecting a graphene or graphene-based additive. It is the rotational disorder of the stacking in the low-defect turbostratic carbon of the present disclosure that distinguishes itself from all the other graphene or graphene-based additives used to date, as the rotational disorder of the low-defect turbostratic carbon stacking of the present application is what offers flexibility to the carbon-based particles of the present application, which therein enables the ability of these carbon-based particles to provide and preserve contact with the active core particle of the composite particles comprising the electrode of the electrochemical cell. The result is an electrochemical cell having increased cycle life, better cycle life stability, enhanced energy density, and superior high rate performance.

Figure 4A:
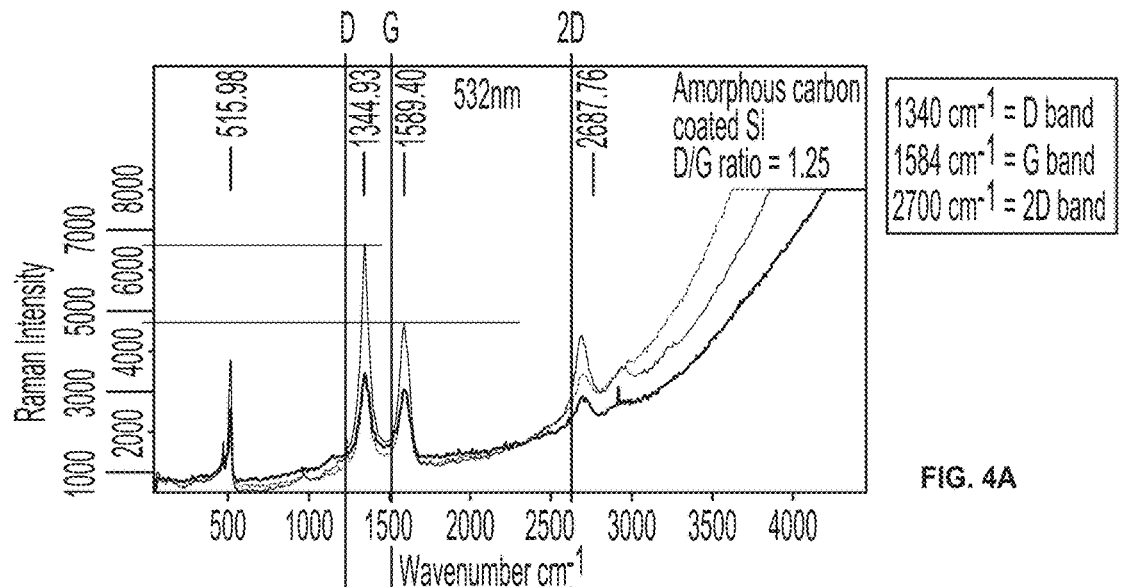
FIGS. 4A, 4B, and 4C illustrate the Raman spectra of electrode active materials comprising $SiO_x$ core particles respectively encapsulated by amorphous carbon, reduced graphene oxide (rGO), and low-defect turbostratic carbon.
Figure 4B:
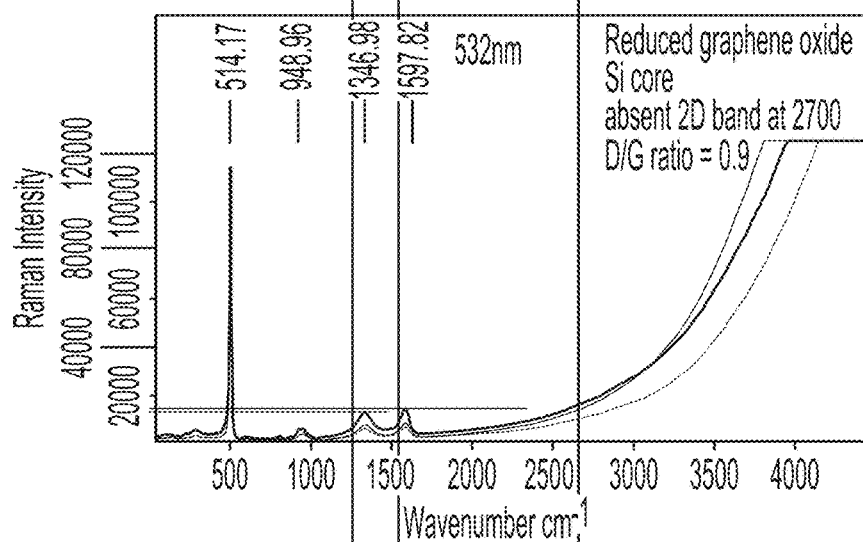
Figure 4C:
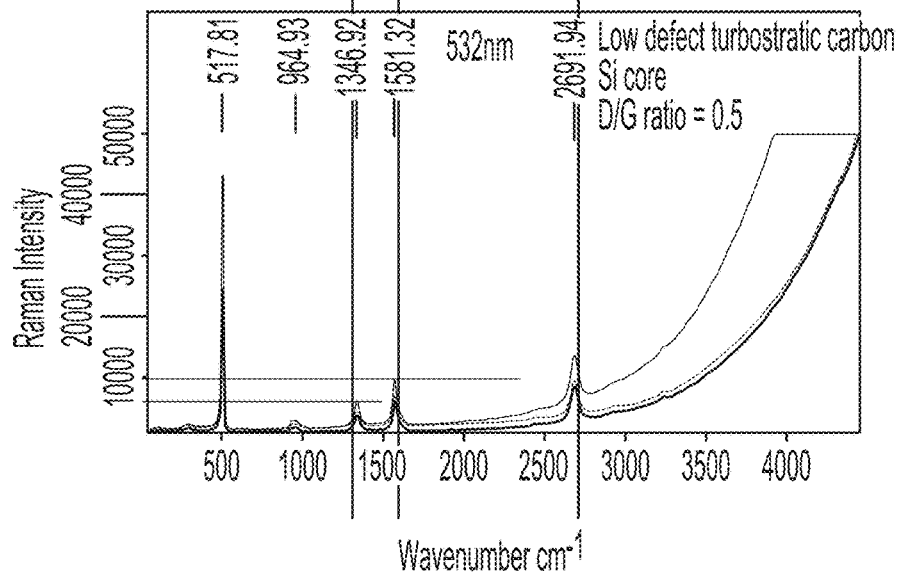

FIGS. 4A-4C illustrate Raman spectra for active material mixtures comprising $SiO_x$ core particles encapsulated by or coated with a carbon material. FIG. 4A is a graph of the Raman spectra for an active material mixture comprising $SiO_x$ core particles coated with an amorphous carbon material. FIG. 4B is a graph of the Raman spectra for an active material mixture comprising $SiO_x$ core particles encapsulated by rGO. FIG. 4C is a graph showing the Raman spectra for an active material mixture comprising $SiO_x$ core particles encapsulated by a low-defect turbostratic carbon. Each spectra is different because of varying layer thickness (size, shape and position of 2D peak around wavelength 2700 $cm^{-1}$) and disorder (size of D peak around wavelength 1340 $cm^{-1}$).

Raman analysis sample preparation involved taking small aliquots of powders such as active material powders, composite material powders, carbon material powder, and placing these powders individually into a clean glass vial. The sample powder is rinsed with methanol. The powder/methanol solutions are then vortexed briefly and sonicated for approximately 10 minutes. The suspension is then transferred to a microscope slide with a micropipette. The slides are then allowed to air dry completely before conducting the analysis.

The Raman spectroscopy analysis of the present application is conducted using confocal Raman spectroscopy on a Bruker Senterra Raman System under the following test conditions: 532 nm laser, 0.02 mW, 50X objective lens, 90 second integration time, 3 co-additions (3 Raman spectroscopy sample runs) using a 50×1000 μm aperture and a 9-18 $cm^{-1}$ resolution. As a point of reference, the D band is not active in the Raman scattering of perfect crystals. The D band becomes Raman active in defective graphitic materials due to defect-induced double resonance Raman scattering processes involving the π-π electron transitions. The intensity of the D band relative to the G band increases with the amount of disorder. The intensity $I_D/I_G$ ratio can thereby be used to characterize a graphene material.

The D and G bands of the amorphous carbon shown in FIG. 4A are both of higher intensity than either the reduced graphene oxide (rGO) D and G bands of FIG. 4B or the turbostratic carbon D and G bands of FIG. 4C. The amorphous carbon also exhibits a substantially higher $I_D/I_G$ ratio (1.25) than do rGO and turbostratic carbon. The suppressed intensity of the amorphous carbon G band compared to that of its D band reflects the lack of crystallinity (also known as its graphitic nature) within its carbon structure. The D peak intensity being higher than the G peak intensity is caused by the high amount of defects in the amorphous carbon network. Hence, the amorphous carbon spectra exhibits low crystallinity and a much higher degree of disorder in its graphitic network compared with more crystalline carbons, such as graphene, graphene oxide, and rGO. Moreover, the higher intensity of the rGO D peak compared with its G peak, and its higher $I_D/I_G$ ratio (almost 2×) compared to the turbostratic carbon D and G peak intensities and $I_D/I_G$ ratio indicates the rGO to have more defects than the turbostratic carbon of the present application.

Table 1 below provides the detail for the Raman spectra of FIGS. 4A-4C.

TABLE 1

|  | D | G | 2D | $I_D/I_G$ | $I_{2D}/I_G$ |
| --- | --- | --- | --- | --- | --- |
| rGO |  |  |  |  |  |
| $Cm^{-1}$ | 1346.98 | 1597.82 | — |  |  |
| Intensity | 9115.5 | 10033.3 | — | .91 | — |
| Low Defect Turbostratic Carbon |  |  |  |  |  |
| $Cm^{-1}$ | 1346.92 | 1581.32 | 2691.9 |  |  |
| Intensity | 2915.3 | 5849.98 | 6009.4 | 0.5 | 1.03 |
| Amorphous Carbon |  |  |  |  |  |
| $Cm^{-1}$ | 1344.93 | 1589.40 | 2695.4 |  |  |
| Intensity | 6194.8 | 4908.2 | 5238.5 | 1.25 | 1.07 |

Careful inspection of these spectra show that when disorder increases, the D band broadens and the relative intensity of the band changes. For the amorphous carbon coated sample, the high intensity (6194.8) and broad D peak indicates a high amount of defects. The G peak being lower in intensity (4908.2) then the D peak (6194.8) indicates a lack of crystallinity. The D peak intensity (9115.5) and G peak intensity (10033.3) of the rGO encapsulated sample are fairly alike. Noticeable, however, is that the D peak intensity (9115.5) of the rGO sample is substantially higher than the D peak intensity (2915.3) of the turbostratic carbon sample indicating that the rGO sample has substantially higher defect density than does the turbostratic carbon sample. Also noticeable is that the G band for the amorphous carbon and the rGO samples are shifted to the right of wavelength 1584 $cm^{-1}$ to wavelength 1589.4 $cm^{-1}$ and 1597.82 $cm^{-1}$ respectively, whereas the G band for the turbostratic carbon sample lies slightly to the left of wavelength of 1584 $cm^{-1}$ at 1581.32 $cm^{-1}$. Of significance is that, unlike the amorphous carbon and the rGO samples, the turbostratic carbon (in this case, graphene sample) does not display much, if any, shift in position, reflecting low-defects therein, thus, the turbostratic carbon sample most nearly resembles an almost 'perfect' turbostratic carbon material.

Composite Particle Formation

According to various embodiments, active material composite particles may be formed by forming a composite mixture comprising core particles of an active material, such as an M-SiO active material, a graphene material, and optionally one or more additives such as CNTs, dispersants, binders, etc.

In particular, the composite mixture may initially comprise a composite suspension formed by mixing a first suspension comprising the core particles dispersed in a polar solvent such as water or ethanol, and a second suspension comprising the graphene material dispersed in a polar solvent. The graphene material may include a turbostratic carbon, such as turbostratic graphene. In various embodiments, the graphene material may include graphene, graphene oxide, partially reduced graphene oxide, or combinations thereof.

In some embodiments, the mixtures may be stabilized by mixing and/or sonication until the mixtures are visibly homogenous. For example, the first mixture may be sonicated or high-shear mixed for from about 30 minutes to about 90 minutes, such as for about 60 minutes, to increase suspension stability.

The first suspension may include from about 0.5 wt % to about 10 wt %, such as from about 1 wt % to about 5 wt %, or about 2 wt % M-SiO particles and a balance of solvent, based on the total weight of the first suspension. The second suspension may include from about 0.5 wt % to about 10 wt %, such as from about 1 wt % to about 5 wt %, or about 2 wt % of the graphene material and a balance of solvent, based on the total weight of the second suspension.

Amounts of the first and second suspensions used to form the composite mixture may be selected such that the composite mixture may have a core particle to carbon weight ratio ranging from about 80:20 to about 95:05, such as from about 90:10 to about 95:05. The composite mixture may be sonicated or high-shear mixed for from about 30 minutes to about 90 minutes, such as for about 60 minutes, to increase suspension stability.

In some embodiments, CNTs may be optionally added to either of the first or second suspension, or directly to the composite mixture. For example, an amount of CNTs may be selected such that the composite mixture may have a core particle to CNT weight ratio of from about 100:0 to about 95:3, such as from about 99.9:0.1 to about 99:1, or about 99:1.

The composite mixture may be processed such that the core particles are coated with the graphene material and optionally the CNTs. For example, the mixture may be dried using various processes, such as a spray-drying process to evaporate the solvent and create a powder comprising composite particles comprising core particles coated with carbon, e.g., turbostratic carbon, e.g., turbostratic graphene. In particular, the composite mixture may be fed through a heated aerosol evaporator to evaporate the solvent and form the composite particles. This process may isotropically compress the graphene material through capillary forces that fully crumple, transforming into crumpled structures having a myriad of wrinkles, bends and twists that do not relax over time.

Depending on the final powder particle requirements, process parameters may vary. For example, crumpled ball-like composite particles are formed by aerosolizing droplets and then rapidly drying them in the heating chamber. For example, an atomizer nebulizes the raw material suspension to form aerosol droplets. The nebulizing step requires sufficient spray parameters to allow the particles within the droplets to become ordered before aerosol evaporation initiates. For turbostratic carbon materials, the particles within the droplet migrate to the surface of the droplet to form a coating on the M-SiO particles upon drying. The coatings minimize particle aggregation and agglomeration as this structure overcomes strong inter-particle van der Waals attraction forces that cause restacking of carbon material sheets which complicates solution processability and reduces particle accessible surface area. This structure is also stable against unfolding or collapsing.

Once the evaporation process is complete, the composite particles may be collected as a powder. After collection, the powder may be heat treated in an inert atmosphere, such as argon gas, to carbonize any remaining surfactant or dispersant. In particular, the powder may be heated at a temperature ranging from about 600° C. to about 800° C., such as a temperature ranging from about 650° C. to about 750° C., or about 700° C. The heating process may have a heating ramp rate ranging from about 5° C./min to about 20° C./min, such as about 10° C./min. The resulting dry composite active material powder can then be classified by sieving or filtration to achieve a desired particle size distribution for a given application.

In the alternative, the composite mixture may be formed by forming a first suspension by dispersing the core particles in a liquid solvent, such as water or ethanol. A polyelectrolyte, such as polydiallyldimethylammonium chloride (PDDA), polyacrylic acid (PAA), or polysodium styrene sulfonate (PSS), may be added to the solvent before or after adding the active material particles to form a first surface charge on the active material particles and thereby stably suspend the active material particles in the solvent. A second suspension may be formed by dispersing a carbon material (e.g., turbostratic graphene powder) in a solvent such as water or ethanol. An oppositely-charged polyelectrolyte may be added to the solvent before or after adding the graphene to form a second surface charge on the graphene and thereby stably suspend the graphene in the solvent. The first and second surface charges may different ones of positive and negative charges.

In some embodiments, the composite mixture may be formed by combining the first and second suspensions, such that the graphene is attracted to the surface of the core particles, due to the difference in charge therebetween, thereby forming composite particles comprising graphene—coated active material particles. The polyelectrolytes on the graphene and active material particles may neutralize one another, such that the composite particles are substantially uncharged.

In various embodiments, the composite mixture may alternatively be formed by forming a dry mixture comprising a carbon material (e.g., turbostratic graphene powder) and the core particles, and which does not include a liquid solvent (i.e., where the composite mixture is not a suspension). A binding material may be added to the mixture, followed by the application of a mechano-fusion process. In particular, the binding material may be physically mixed with the graphene powder and the core particles, such that core particles are coated with graphene using the binder, to form the composite particles.

Non-limiting binding materials may include polymethyl methacrylate, polyethylene, polypropylene, polystyrene, polytetrafluoroethylene, polyvinylidene fluoride, polyethylene terephthalate, polyacrylonitrile, polydiallyldimethylammonium chloride, polyacrylic acid, lithiated polyacrylic acid (LiPAA), polysodium styrene sulfonate, polyvinylpyrrolidone, polyethylene glycol, polyethylene oxide, nylon, carboxymethyl cellulose, polysiloxanes, polyaramids, polyamides, polyimides, polyacrylates, polycarbonates, polyurethane, polyacetylene, polypyrrole, polyphenylene sulfuide, poly(3,4-ethylenedioxythiophene), poly(1,3-dioxolane), polyphenylene vinylene, polythiophene, polyaniline, polyfluorene, polypyrene, petroleum coke, coal tar pitch, carbon black, carbon nanotubes, sucrose, silica, indium tin oxide, aluminum-doped zinc oxide, lithium hydroxide, lithium acetate, lithium perchlorate, lithium fluoride, lithium nitride, lithium nitrate, lithium hexafluorophosphate, LiTFSI, LiFSI, NASICON, LISICON, UPON, $Li_3PO_4$, $Li_7P_3S_{11}$, perovskites, garnets, polymerized ionic liquids, or any combinations thereof.

In various embodiments, the amounts of other embodiments, particles of the M-SiO material and the carbon material including low-defect turbostratic carbon may be dry mixed in a dry weight ratio between 7:3 and 99:1. In some embodiments, CNTs may be added to the dry mixture. For example, the M-SiO material, the carbon material, and optionally the CNTs may be combined to form a dry mixture that does not include a liquid solvent, or in a wet mixture that does include a liquid solvent. For example, in some embodiments, the M-SiO material and carbon material may be suspended in a polar liquid solvent such as water or ethanol by high shear mixing or ultrasonication. A suspension of some materials may also be promoted through the use of a surfactant and/or binder. Of significance is that the high conductivity enabled by the low-defect turbo stratic structure allows lower ratios of the material (<90:10 and as low as 99:1) to be mixed with the electrochemically active material for comparable conductivity enhancements when compared to other carbon additives.

Electrodes and Electrochemical Cells

According to various embodiments, the composite particles may be used as the active material of an electrode such as an anode. For example, the composite particles may be mixed with conductive agents, binders, and/or solvents, etc. to form a slurry. The slurry may be coated on a current collector to form an electrode.

The conductive agents may include a low-defect turbostratic carbon material, carbon black, graphite, graphite oxide, graphene, exfoliated graphite or graphene, graphene oxide, rGO, partially reduced GO, carbon nanotubes (CNTs) such as single walled, double walled or multi-walled CNTs, graphene platelets, nanoplatelets or nanoparticles, nanoplatelets or nanoparticles comprising a graphene sheet or a few graphene sheets, or combinations thereof.

An electrode may comprise a composite material mixture capable of providing 100% of the anode lithium capacity or may be mixed with other lithium active materials such as graphite, graphite oxide, graphene, graphene oxide, rGO, and partially reduced GO in a 0-100% mixture. If the electrode includes a binder to hold the electrode material together, the binder may comprise a polymeric material such as a polyvinylidene fluoride (PVDF), carboxy methyl cellulose (CMC), styrene butadiene rubber (SBR), CMC/SBR, polyacrylic acid (PAA), lithium polyacrylic acid (LiPAA), or combinations thereof. The electrode material components are then mixed into a polar solvent such as water or N-methyl-2-pyrrolidone (NMP) at a solids loading in the range of about 20 wt % to about 60 wt % to form an electrode slurry.

Mixing is typically achieved with a planetary mixer and high shear dispersion blade. The electrode slurry is then coated onto a metal substrate, typically copper or aluminum, at an appropriate mass loading to balance the lithium capacity of the anode with that of the selected cathode. Coating can be conducted using a variety of apparatus such as doctor blades, comma coaters, gravure coaters, and slot die coaters. After coating the slurry is dried under forced air between room temperature and about 120° C. Prior to cell assembly, the final electrode processing steps include pressing the electrode to reduce internal porosity and slitting to an appropriate geometry. Typical anode pressed densities can range from about 1.0 g/cc to about 1.7 g/cc depending on the composition of the electrode and the target application. Cathode pressed densities may range from about 2.7 to about 4.7 g/cc.

In various embodiments, the electrode is an anode electrode of an electrochemical cell, the electrochemical cell also comprising a cathode and a non-aqueous electrolyte comprising a lithium salt. The anode comprises a metalloid or metal oxide material. The anode further comprises a low-defect turbostratic carbon material. The anode may comprise composite particles. The composite particles may further comprise a crumpled ball-like structure, wherein the crumpled structure comprises a low-defect turbostratic carbon material encapsulating a metalloid or metal oxide material in its core. The anode may alternately comprise an anode material mixture having particles comprising a metalloid or metal oxide material and particles comprising a turbostratic carbon material. The turbostratic carbon material may comprise low-defect turbostratic carbon sheets that wrap around and/or are bonded to at least some of the core particles comprising the metalloid or metal oxide material. The cathode may comprise a carbon-based material. In addition to the traditional carbon-based materials used in electrochemical cell cathode electrodes, it is contemplated that the low-defect turbostratic carbon material of the present application may also be used as an additive to the cathode electrode of an electrochemical cell.

Construction of an electrochemical cell involves the pairing of a coated anode substrate and a coated cathode substrate that are electronically isolated from each other by a polymer and/or a ceramic electrically insulating separator. The electrode assembly is hermetically sealed in a housing, which may be of various structures, such as but not limited to a coin cell, a pouch cell, or a can cell, and contains a nonaqueous, ionically conductive electrolyte operatively associated with the anode and the cathode. The electrolyte is comprised of an inorganic salt dissolved in a nonaqueous solvent and more preferably an alkali metal salt dissolved in a mixture of low viscosity solvents including organic esters, ethers and dialkyl carbonates and high conductivity solvents including cyclic carbonates, cyclic esters and cyclic amides. A non-limiting example of an electrolyte may include a lithium hexafluorophosphate ($LiPF_6$) or lithium bis(fluorosulfonyl)imide (LiFSi) salt in an organic solvent comprising one of: ethylene carbonate (EC), diethyl carbonate (DEC), dimethyl carbonate (DMC), fluoroethylene carbonate (FEC) or combinations thereof. Additional solvents useful with the embodiment of the present invention include dialkyl carbonates such as tetrahydrofuran (THF), methyl acetate (MA), diglyme, trigylme, tetragylme, 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, dipropyl carbonate, and combinations thereof. High permittivity solvents that may also be useful include cyclic carbonates, cyclic esters and cyclic amides such as propylene carbonate (PC), butylene carbonate, acetonitrile, dimethyl sulfoxide, dimethyl formamide, dimethyl acetamide, gamma-valerolactone, gammabutyrolactone (GBL), N-methyl-2-pyrrolidone (NMP), and combinations thereof. The electrolyte serves as a medium for migration of lithium ions between the anode and the cathode during electrochemical reactions of the cell, particularly during discharge and re-charge of the cell. The electrochemical cell may also have positive and negative terminal and/or contact structures.

Experimental Examples (Li-Metalized SiO)

The following examples relate to anode formed using anode active materials (e.g., composite particles) of various embodiments of the present disclosure and comparative anode active materials particles, and are given by way of illustration and not by way of limitation. In the examples, % is percent by weight, g is gram, CE is coulombic efficiency, and mAh/g is capacity. In addition, the M-SiO active material used in the following Formulations 1-4, Examples 1-4, and Control Example include lithium-metalized SiO (LM-SiO).

Formulation: 1

A composite active material of Formula 1 was synthesized by suspending 2 grams of LM-SiO into 98 grams of water to create a 2 wt % suspension. The LM-SiO suspension was sonicated for 60 minutes to improve suspension stability. After sonication, 11.11 grams of a 2 wt % graphene suspension was added to the LM-SiO suspension to create a homogenous 2 wt % composite suspension. The ratios of the LM-SiO and graphene suspension were chosen such that the mass ratio is 90:10 LM-SiO:graphene. The composite suspension was then sonicated an additional 60 minutes. After sonication, the composite suspension was then fed through a heated aerosol evaporator to evaporate the water and create the graphene-coated LM-SiO particles. After collecting the powder, the material was then subjected to a thermal process at 700° C. for 1 hour (10° C./min heating ramp) under Argon atmosphere to drive off residual water and to carbonize surfactants present in stabilizing the graphene suspension. The resulting composite active material of Formulation 1 material was then collected.

Formulation: 2

A composite active material of Formula 2 was synthesized by suspending 2 grams of LM-SiO into 98 grams of water to create a 2 wt % suspension. The LM-SiO suspension is sonicated for 60 minutes to improve suspension stability. After sonication, 11.11 grams of a 2 wt % graphene oxide (GO) suspension is added to the LM-SiO suspension to create a homogenous 2 wt % composite suspension. The ratios of the LM-SiO and GO suspension is chosen such that the mass ratio is 90:10 LM-SiO:reduced graphene oxide. The composite suspension is then sonicated an additional 60 minutes. After sonication, the composite suspension is then fed through a heated aerosol evaporator to evaporate the water and create the graphene-coated LM-SiO particles. After collecting the powder, the material is then subjected to a thermal process at 700C for 1 hour (10° C./min heating ramp) under Argon atmosphere to drive off residual water and to carbonize surfactants present in stabilizing the graphene suspension. The resulting composite active material of Formulation 2 material was then collected.

Formulation: 3

A composite active material of Formula 3 was synthesized by suspending 2 grams of LM-SiO into 98 grams of water to create a 2 wt % suspension. The LM-SiO suspension is sonicated for 60 minutes to improve suspension stability. After sonication, 10.78 grams of a 2 wt % graphene suspension and 6.66 mg carbon nanotubes (CNTs) are added to the LM-SiO suspension to create a homogenous 2 wt % composite suspension. The ratios of the LM-SiO and graphene suspension is chosen such that the mass ratio is 90:9.7:0.3 LM-SiO:graphene:CNTs. The composite suspension was then sonicated an additional 60 minutes. After sonication, the composite suspension was then fed through a heated aerosol evaporator to evaporate the water and create the graphene-coated LM-SiO particles. After collecting the powder, the material was then subjected to a thermal process at 700C for 1 hour (10° C./min heating ramp) under Argon atmosphere to drive off residual water and to carbonize surfactants present in stabilizing the graphene suspension. The resulting composite active material of Formulation 3 material was then collected.

Formulation: 4

A composite active material of Formula 4 was synthesized by suspending 2 grams of LM-SiO into 98 grams of water to create a 2 wt % LM-SiO suspension. Additionally, 0.1g polymer dispersant was added to the suspension to improve stability. The LM-SiO suspension was sonicated for 60 minutes to improve suspension stability. After sonication, 11.11 grams of a 2 wt % graphene suspension was added to the LM-SiO suspension to create a homogenous 2 wt % composite suspension. The ratios of the M-SiO and graphene suspension were chosen such that the mass ratio is 90:10 LM-SiO:graphene. The composite suspension was then sonicated an additional 60 minutes. After sonication, the composite suspension was then fed through a heated aerosol evaporator to evaporate the water and create the graphene-coated LM-SiO particles. After collecting the powder, the material was then subjected to a thermal process at 700C for 1 hour (10° C./min heating ramp) under Argon atmosphere to drive off residual water and to carbonize surfactants present in stabilizing the graphene suspension. The resulting composite active material of Formulation 4 material was then collected.

Control Formulation

A control anode active material was created by combining 0.5 grams of LM-SiO anode active material along with 1.3 grams of graphite, 0.04 grams conductive agent (C65 carbon black), 7.72 grams of an aqueous binder (CMC 1.1 wt %), and 0.1875 grams of 40wt % SBR into a small mixing jar. The combined materials were then mixed in a planetary-like mixer with 30 minutes of rigorous mixing to form a Control Formulation slurry.

Control Example

The Control anode slurry was coated on a copper foil with a loading of 3 mAh/cm2 and an electrode density of 1.3 g/cc. The coating was dried and calendared to a porosity of 40-45%. The electrode coatings were assembled into half-cells (excess counter electrode material=lithium metal) and 100 μL of electrolyte was injected into the cells. The cells were electrochemically "formed" under C/20, C/10, C/5 charge-discharge cycles. The resulting half-cells were then characterized under a standard C/2 charge-discharge protocol until the anode capacity is 80% of its initial capacity.

EXAMPLE 1

An anode material was created by combining 0.5 grams of Formulation 1 composite anode active material along with 1.3 grams of graphite, 0.04 grams conductive agent (C65 carbon black), 7.72 grams of an aqueous binder (carbon methyl cellulose (CMC) 1.1 wt %), and 0.1875 grams of 40wt % SBR into a small mixing jar. The combined materials were then mixed in a planetary-like mixer for 30 minutes of rigorous mixing. The resulting anode slurry was coated on a copper foil with a loading of 3 mAh/cm2 and an electrode density of 1.3 g/cc. The coating was dried and calendared to a porosity of 40-45%. The electrode coatings were assembled into half-cells (excess counter electrode material=lithium metal) and 100 μL of electrolyte was injected into the cells. The cells were electrochemically "formed" under C/20, C/10, C/5 charge-discharge cycles. The resulting half-cells were then characterized under a standard C/2 charge-discharge protocol until the anode capacity is 80% of its initial capacity.

EXAMPLE 2

An anode material was created by combining 0.5 grams of Formulation 2 composite anode active material along with 1.3 grams of graphite, 0.04 grams conductive agent (C65 carbon black), 7.72 grams of an aqueous binder (CMC 1.1 wt %), and 0.1875 grams of 40wt % SBR into a small mixing jar. The combined materials were then mixed in a planetary-like mixer for 30 minutes of rigorous mixing. The resulting anode slurry is coated on a copper foil with a loading of 3 mAh/cm2 and an electrode density of 1.3 g/cc. The coating was dried and calendared to a porosity of 40-45%. The electrode coatings were assembled into half-cells (excess counter electrode material=lithium metal) and 100 μL of electrolyte was injected into the cells. The cells were electrochemically "formed" under C/20, C/10, C/5 charge-discharge cycles. The resulting half-cells were then characterized under a standard C/2 charge-discharge protocol until the anode capacity is 80% of its initial capacity.

EXAMPLE 3

An anode material was created by combining 0.5 grams of Formulation 3 composite anode active material along with 1.3 grams of graphite, 0.04 grams conductive agent (C65 carbon black), 7.72 grams of an aqueous binder (CMC 1.1 wt %), and 0.1875 grams of 40wt % SBR into a small mixing jar. The combined materials were then mixed in a planetary-like mixer for 30 minutes of rigorous mixing. The resulting anode slurry was coated on a copper foil with a loading of 3 mAh/cm2 and an electrode density of 1.3 g/cc. The coating was dried and calendared to a porosity of 40-45%. The electrode coatings were assembled into half-cells (excess counter electrode material=lithium metal) and 100 μL of electrolyte was injected into the cells. The cells were electrochemically "formed" under C/20, C/10, C/5 charge-discharge cycles. The resulting half-cells were then characterized under a standard C/2 charge-discharge protocol until the anode capacity was 80% of its initial capacity.

EXAMPLE 4

Figure 5:
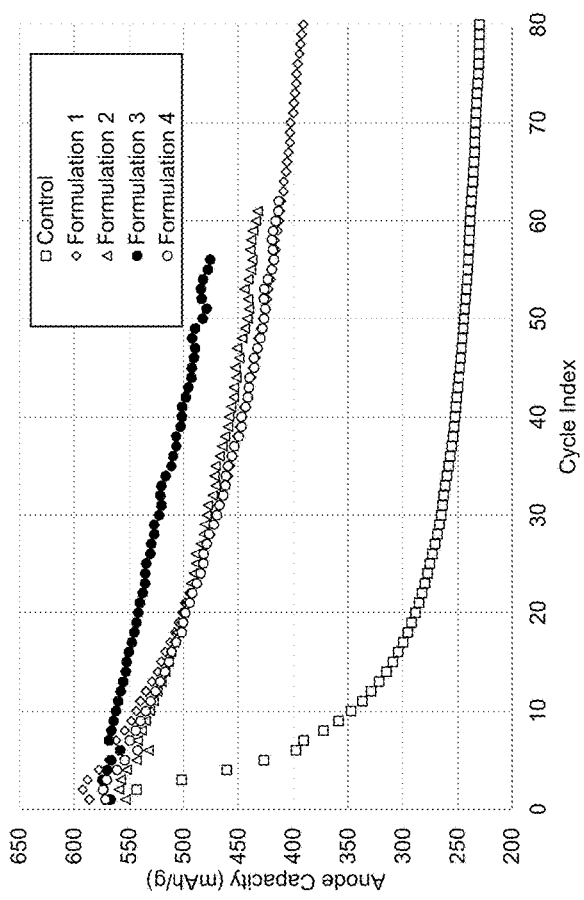
FIG. 5 is a graph showing the cycle life for exemplary and comparative half-cells containing lithium-metalized SiO (LM-SiO), according to various embodiments of the present disclosure.

An anode material was created by combining 0.5 grams of Formulation 4 composite anode active material along with 1.3 grams of graphite, 0.04 grams conductive agent (C65 carbon black), 7.72 grams of an aqueous binder (CMC 1.1 wt %), and 0.1875 grams of 40wt % SBR into a small mixing jar. The combined materials were then mixed in a planetary-like mixer for 30 minutes of rigorous mixing. The resulting anode slurry was coated on a copper foil with a loading of 3 mAh/cm2 and an electrode density of 1.3 g/cc. The coating was dried and calendared to a porosity of 40-45%. The electrode coatings were assembled into half-cells (excess counter electrode material=lithium metal) and 100 μL of electrolyte was injected into the cells. The cells were electrochemically "formed" under C/20, C/10, C/5 charge-discharge cycles. The resulting half-cells were then character-ized under a standard C/2 charge-discharge protocol until the anode capacity is 80% of its initial capacity FIG. 5 is a graph showing the electrochemical cycling performance of half-cells formed using the Control Formulation (Control) and Formulations 1-4 (Examples 1-4). As discussed in detail below the anodes of the Control half-cells included 25 wt % bare LM-SiO material, and the anodes of the Examples 1-4 half-cells included 25 wt % of graphene coated LM-SiO materials of Formulations 1-4, respectively. The anodes of the Control and Examples 1-4 half-cells also included 65 wt % graphite, 2 wt % C65, 4.25 wt % CMC, and 3.75 wt % styrene-butadiene rubber (SBR).

The following Table 2 includes the electrochemical cycling performance of the half-cells shown in FIG. 5.

TABLE 2

| Active Material | LM-SiO Control (Raw) | LM-SiO + 10% Graphene (Form. 1) | LM-SiO + 10% Graphene (Form. 2) | LM-SiO + 10% Graphene (Form. 3) | LM-SiO + 10% Graphene (Form. 4) |
|---|---|---|---|---|---|
| $1^{st}$ CE (%) | 86.9% | 87.3% | 88.1% | 88.6% | 88.4% |
| $1^{st}$ DC (mAh/g) | 656 | 672 | 628 | 639 | 647 |
| $1^{st}$ CC (mAh/g) | 570 | 586 | 553 | 567 | 571 |
| C/2 Max (mAh/g) | 337 | 540 | 528 | 560 | 531 |
| Avg. CE, 10-50 cycles | 99.2% | 99.3% | 99.5% | 99.6% | 99.4% |
| $1^{st}$ CE (%) (LD-SiO only) | 83.6% | 84.3% | 85.6% | 87.0% | 86.1% |
| $1^{st}$ DC (mAh/g) (LD-SiO only) | 1637 | 1714 | 1503 | 1556 | 1594 |
| $1^{st}$ CC (mAh/g) (LD-SiO only) | 1368 | 1445 | 1286 | 1354 | 1373 |

The following Table 3 includes the electrochemical cycling values of the half-cells shown in FIG. 5.

TABLE 3

| Material | Initial Capacity (mAh/g) | Capacity Retention ($50^{th}$ cycle) | Retention Improvement ($50^{th}$ cycle) |
|---|---|---|---|
| Control (25% LM-SiO) | 570 | 43% | — |
| Formulation 1 (25% LM-SiO) | 586 | 72% | 67% |
| Formulation 2 (25% LM-SiO) | 553 | 79% | 84% |
| Formulation 3 (25% LM-SiO) | 567 | 84% | 95% |
| Formulation 4 (25% LM-SiO) | 571 | 74% | 72% |

As can be seen in FIG. 5 and Tables 2 and 3, after 50 charge/discharge cycles, the half-cells including the Formulation 1 material showed a 67% improvement in cycle life, the half-cells including the Formulation 2 material showed 84% improvement in cycle life over, the half-cells including the Formulation 3 material showed a 95% improvement in cycle life, and the half-cells including the Formulation 4 material showed a 72% improvement in cycle life, as compared to the half-cells including the Control material.

Accordingly, the present composite particles unexpectedly provided a substantial increase in the usable cycle life of the LM-SiO material for commercial lithium-ion battery applications. This improved usable cycle life is due to the unexpected and non-obvious ability of graphene to stabilize the lithium-containing SiO active material to electrochemical cycling. The usable cycle life is defined as the number of cycles (Cycle n) that a cell can cycle while maintaining a capacity that is at least 80% of its initial capacity (i.e. Cycle 1). For example, Formulation 4 showed a half-cell cycle life of approximately 50 cycles (n=50) to 80% capacity retention (Cycle 1~600 mAh/g initial capacity so 480 mAh/g=80% capacity retention). In comparison, the control material exhibited a half-cell cycle life of only 5 cycles to 80% capacity retention.

According to embodiments, a battery has a $50^{th}$ cycle capacity retention of at least 72%, such as 80 to 84% and a first cycle efficiency of at least 87%, such as 87 to 88.6%.

Figure 6:
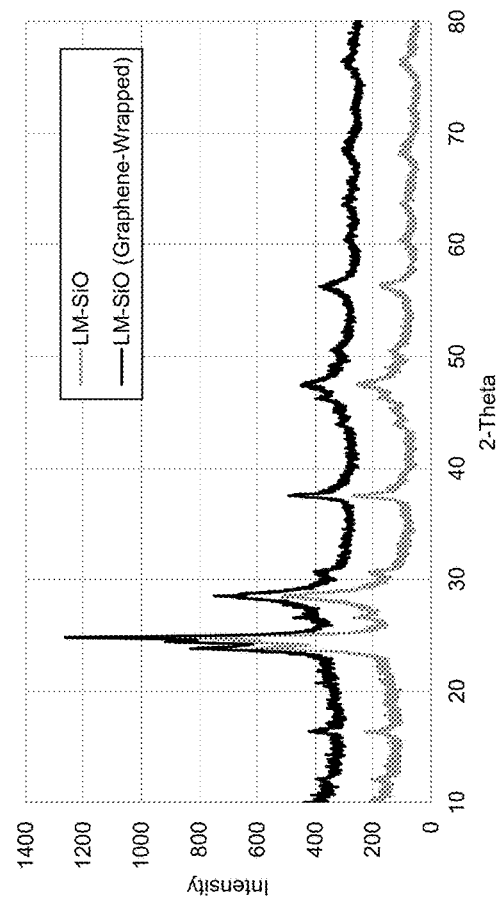
FIG. 6 is a graph showing X-ray diffraction results of a Control material compared to an Example 1 material according to various embodiments of the present disclosure.

FIG. 6 is a graph showing X-ray diffraction results of the Control material (shown in gray) compared to the Example 1 material (shown in black). As can be seen in FIG. 6, no change to particle crystallinity and structure was observed due to the graphene addition and processing.

Experimental Examples (Mg-Metalized SiO)

The following examples relate to anode formed using anode active materials (e.g., composite particles) of various embodiments of the present disclosure and comparative anode active materials particles, and are given by way of illustration and not by way of limitation. In the examples, % is percent by weight, g is gram, CE is coulombic efficiency, and mAh/g is capacity. In addition, the M-SiO active material used in the following Formulation 5, Example 5, and Control Example included magnesium-metalized SiO (MM-SiO).

Formulation 5: A composite active material of Formula 5 was synthesized by suspending 2 grams of MM-SiO (i.e., a magnesium containing silicon oxide) into 98 grams of water to create a 2 wt % suspension. The MM-SiO suspension is sonicated for 60 minutes to improve suspension stability. After sonication, 5.05 grams of a 2 wt % graphene suspension and 4.21 mg carbon nanotubes (CNTs) are added to the MM-SiO suspension to create a homogenous 2 wt % composite suspension. The ratios of the MM-SiO and graphene suspension is chosen such that the mass ratio is 95:4.8:0.2 MM-SiO:graphene:CNTs. The composite suspension was then sonicated an additional 60 minutes. After sonication, the composite suspension was then fed through a heated aerosol evaporator to evaporate the water and create the graphene-coated MM-SiO particle. After collecting the powder, the material was then subjected to a thermal process at 700C for 1 hour (10° C./min heating ramp) under Argon atmosphere to drive off residual water and to carbonize surfactants present in stabilizing the graphene suspension. The resulting composite active material of Formulation 5 material was then collected.

EXAMPLE 5

An anode material was created by combining 0.5 grams of Formulation 5 composite anode active material along with 0.033 grams conductive agent (C65 carbon black), and 1.33 grams of an aqueous binder (LiPAA, 10 wt %) into a small mixing jar. The combined materials were then mixed in a planetary-like mixer for 30 minutes of rigorous mixing. The resulting anode slurry was coated on a copper foil with a loading of 3 mAh/cm2 and an electrode density of 1.3 g/cc. The coating was dried and calendared to a porosity of 40-45%. The electrode coatings were assembled into half-cells (excess counter electrode material=lithium metal) and 100 μL of electrolyte was injected into the cells. The cells were electrochemically "formed" under C/20, C/10, C/5 charge-discharge cycles. The resulting half-cells were then characterized under a standard C/2 charge-discharge protocol until the anode capacity is 80% of its initial capacity.

MM-SiO Control Example: An anode material was created by combining 0.5 grams of MM-SiO anode active material along with 0.033 grams conductive agent (C65 carbon black), and 1.33 grams of an aqueous binder (LiPAA, 10 wt %) into a small mixing jar. The combined materials were then mixed in a planetary-like mixer for 30 minutes of rigorous mixing. The resulting anode slurry was coated on a copper foil with a loading of 3 mAh/cm2 and an electrode density of 1.3 g/cc. The coating was dried and calendared to a porosity of 40-45%. The electrode coatings were assembled into half-cells (excess counter electrode material=lithium metal) and 100 μL of electrolyte was injected into the cells. The cells were electrochemically "formed" under C/20, C/10, C/5 charge-discharge cycles. The resulting half-cells were then characterized under a standard C/2 charge-discharge protocol until the anode capacity is 80% of its initial capacity.

Figure 7:
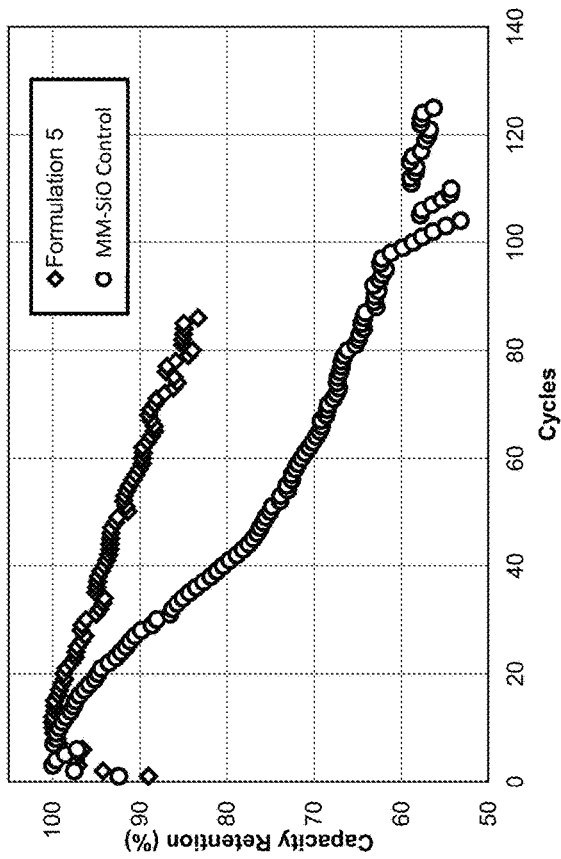
FIG. 7 is a graph showing capacity retention of cycled exemplary and control half cells containing magnesium-metalized SiO (MM-SiO).
Figure 8:
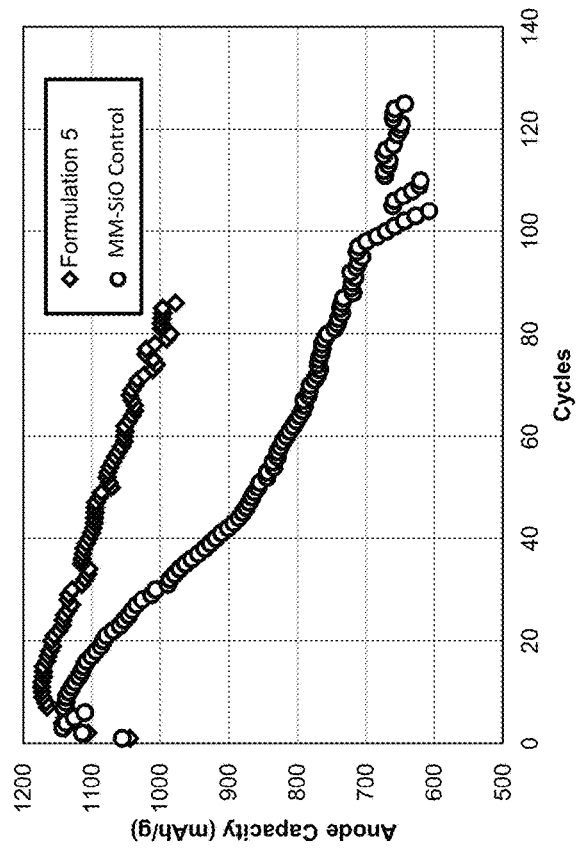
FIG. 8 is a graph showing the anode capacity of the half cells of FIG. 7.

FIG. 7 is a graph showing capacity retention of cycled half cells including the MM-SiO material of Formulation 5 and the MM-SiO Control Example, and FIG. 8 is a graph showing the anode capacity of the cycled half cells of FIG. 7. Referring to FIGS. 7 and 8, it can be seen that Formulation 5 provided significantly better anode capacity and capacity retention than the MM-SiO control Example.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. Active material composite particles for a lithium ion secondary battery, the composite particles each comprising:
   a core particle comprising an alkali metal or an alkali earth metal silicate; and
   a coating disposed on the surface of the core particle, the coating comprising turbostratic carbon having a Raman spectrum having:
      a D band having a peak intensity ($I_D$) at wave number between 1330 $cm^{-1}$ and 1360 $cm^{-1}$;
      a G band having a peak intensity ($I_G$) at wave number between 1580 $cm^{-1}$ and 1600 $cm^{-1}$; and
      a 2D band having a peak intensity ($I_{2D}$) at wave number between 2650 $cm^{-1}$ and 2750 $cm^{-1}$,
   wherein:
      a ratio of $I_D/I_G$ ranges from 0.3 to 0.7; and
      a ratio of $I_{2D}/I_G$ ranges from about 0.4 to about 2,
   wherein at least some of the core particles composite particles are completely encapsulated by the corresponding coating.

2. The composite particles of claim 1, wherein the core particle represents from about 80 wt % to about 99.5 wt % of the total weight of the composite particles.

3. The composite particles of claim 2, wherein the coating represents from about 0.5 wt % to about 20 wt % of the total weight of the composite particles.

4. The composite particles of claim 3, wherein the turbostratic carbon represents from about 1 wt % to about 10 wt % of the total weight of the particles.

5. The composite particles of claim 1, wherein from about 90 wt % to about 100 wt % of the turbostratic carbon is in the form of platelets comprising from 1 to 10 sheets of graphene.

6. The composite particles of claim 5, wherein the coating further comprises from about 0.1 wt % to about 1 wt % carbon nanotubes (CNTs), based on the total weight of the composite particles.

7. The composite particles of claim 1, wherein at least some additional ones of the core particles are only partially encapsulated by the corresponding coatings.

8. The composite particles of claim 1, wherein the composite particles have an average particle size ranging from about 3 μm to about 10 μm.

9. The composite particles of claim 1, wherein the core particle comprises:
a primary phase comprising $Li_2Si_2O_5$, $Li_2SiO_3$, $Li_4SiO_4$, or any combination thereof, and
crystalline silicon domains dispersed within the primary phase.

10. The composite particles of claim 9, wherein the core particle further comprises SiOx domains dispersed within the primary phase, where x ranges from 0.8 to 1.2.

11. The composite particles of claim 9, wherein:
the primary phase comprises $Li_2Si_2O_5$; and
the crystalline silicon domains have an average particles size less than 100 nm.

12. The composite particles of claim 1, wherein the core particle comprises:
a primary phase comprising $MgSiO_3$, $Mg_2SiO_4$, or combination thereof; and
crystalline silicon domains dispersed within the primary phase.

13. The composite particles of claim 1, wherein:
the ratio of $I_{2D}/I_G$ ranges from 0.8 to 1.2;
$I_D$ is at wave number of about 1340 $cm^{-1}$;
$I_G$ is at wave number of about 1584 $cm^{-1}$; and
$I_{2D}$ is at a wave number of about 2700 $cm^{-1}$.

14. An electrode comprising:
the composite particles of claim 1; and
a binder.

15. The electrode of claim 14, wherein the binder comprises polytetrafluoroethylene (PTFE), polyvinylidene fluoride (PVDF), poly(acrylic) acid, polyethylenetetrafluoroethylene (ETFE), polyamides, and polyimides, polyethylene (UHMW), carboxy methyl cellulose (CMC), styrene butadiene rubber (SBR), polyacrylic acid (PAA), lithium polyacrylic acid (LiPAA), or mixtures thereof.

16. The electrode of claim 14, further comprising a conductive additive selected from the group consisting of carbon black, carbon nanotubes, an electrically conductive polymer, graphite, a metallic powder, nickel, aluminum, titanium, stainless steel, and any combination thereof.

17. A lithium secondary battery comprising:
an anode comprising the electrode of claim 14;
a cathode;
a casing housing the anode and cathode; and
an electrolyte disposed between the anode and cathode.

18. The battery of claim 17, wherein the battery has a $50^{th}$ cycle capacity retention of at least 72% and a first cycle efficiency of at least 87%.

* * * * *